UNITED STATES PATENT OFFICE.

CHARLES GLASER, OF BALTIMORE, MARYLAND.

PROCESS OF PRODUCING CAMPHENE.

No. 923,967.  Specification of Letters Patent.  Patented June 8, 1909.

Application filed December 11, 1905. Serial No. 291,330.

*To all whom it may concern:*

Be it known that I, CHARLES GLASER, citizen of the United States of America, and resident of the city of Baltimore and State of Maryland, have invented certain new and useful Improvements in Processes of Making Camphene, of which the following is a specification.

My invention relates to a process of making camphene from bornyl-chlorid, which is usually described as pinene-hydro-chlorid. This substance has a melting point of 125–131° C., boiling point of 210° C. The material belongs to the "borneol series," having a formula as follows:—$C_{10}H_{16}HCl$.

Heretofore it has been customary to prepare camphene by the saponification of bornyl-chlorid by means of caustic alkalies,—lime, anilin, acetates of alkalies, and other similar substances; it being believed that the presence of some basic substance was necessary to remove the HCl group from the hydro-carbon.

I have discovered that if bornyl-chlorid or as the substance is more properly called bornyl-chlorid, be distilled at a temperature of from 180° to 210° C., a dissociation takes place resulting in the formation of hydrochloric acid and camphene, two separate stable compounds, which may be separated by passing the gases through a still in which the camphene may be condensed while the hydro-chloric acid will not only not be condensed but will not reunite with the camphene to reform bornyl chlorid, but may be led off and preserved for future use, while the camphene if redistilled at 157–5° to 158–5° C. may be purified and obtained in crystalline form practically pure.

Pinene-hydro-chlorid boils at 210° C., dipentene at 174–5° C., camphene at 157–5° to 158–5° C.

When distillation is begun the hydrochloric acid begins to go off at a temperature of about 157–5° C. and at the same time some camphene is formed. As the temperature rises the point must be passed at which dipentene will be formed by the dissociation of the hydro-chloric acid gas.

It is the purpose of this process to produce camphene and not dipentene.

I have found that if the bornyl-chlorid is heated up rapidly to a temperature of 180° to 190° C., and the distillate whether of camphene, dipentene or bornyl-chlorid is refluxed or returned to the original vessel and the heating continued, that as the quantity of camphene increases the temperature at which the rearrangement of molecules takes place with the formation of HCl will become less, and finally, after this distillation and return of the distillate has been carried on for a period of an hour or longer, if the distillate instead of being returned to the still is collected and separated, it will be found to contain a high per cent. of camphene. About 70% has been obtained. If this distillate be redistilled at a temperature of 157–5° to 158–5° C., pure camphene may be recovered.

I have found that heat alone is necessary to produce camphene and hydrochloric acid by the decomposition of bornyl-chlorid, but this action may be accelerated or prevented by the presence of various substances. Sharp sand or any insoluble inert material with sharp edges will to some extent assist the action,—some metals and metallic compounds such as copper or a copper compound will greatly assist the action, while iron and zinc will almost entirely prevent the formation of camphene but produce substances quite different from camphene. The action of sand or copper or a copper compound appears to be catalytic. The presence of the catalytic agent not only assists the formation of camphene but also retards and in great measure prevents the formation of dipentene.

Having thus described my invention, what I claim and desire to secure by Letters Patent is:

1. The production of camphene from bornyl-chlorid by the distillation of that substance at a temperature between 180° and 210° C. and for a time refluxing the distillate, then separating the distillate and collecting it.

2. The production of camphene from bornyl-chlorid by the distillation of that substance at a temperature between 180° and 210° C. and for a period of time refluxing the distillate while allowing the vapor of hydrochloric acid to escape, then condensing and separating the distillate.

3. The process for making camphene which consists of subjecting bornyl-chlorid to distillation under conditions which will permit the escape of HCl and the collection of the camphene as a distillate.

4. The process of producing camphene from bornyl-chlorid which consists of heating this substance to a temperature of 180 to 210 degrees C., producing a separation of the HCl, and collecting the camphene as a distillate.

5. The production of camphene from bornyl-chlorid which consists of heating that substance to a temperature of from 180° to 210° C., when hydro-chloric acid and camphene will be produced by separation, condensing the camphene, and passing off the hydro-chloric acid gas.

6. The production of camphene from bornyl-chlorid which consists of heating that substance to a temperature of from 180° to 210° C. when hydro-chloric acid and camphene will be produced by dissociation of the pinene-hydro-chlorid, condensing the camphene, and then redistilling the camphene at a temperature of 157-5° to 158-5° C.

7. The method of producing camphene which consists of heating bornyl-chlorid in the presence of a catalytic agent.

8. The method of producing camphene which consists of distilling bornyl-chlorid in the presence of substance containing copper.

9. The method of producing camphene which consists of distilling bornyl-chlorid at a temperature of from 180° to 210° C., returning the distillate to the still for a period of time, while passing off the separated hydro-chloric acid, and then separating the distillate and subsequently redistilling the distillate at a temperature of from 157-5° to 158-5°, when practically pure camphene may be recovered.

10. The method of producing camphene which consists of distilling bornyl-chlorid at a temperature of from 180° to 210° C., in the presence of a catalytic agent, returning the distillate to the still for a period of time, while passing off the separated hydro-chloric acid, and then separating the distillate and subsequently redistilling the distillate at a temperature of from 157-5° to 158-5°, when practically pure camphene may be recovered.

Signed by me at Baltimore city and State of Maryland this 5" day of December 1905.

CHARLES GLASER.

Witnesses:
THEODORE E. STRAUS,
FLORENCE BARRETT.